(No Model.)

J. B. A. DE WINTER.
PLASTER.

No. 302,116. Patented July 15, 1884.

WITNESSES:
A. J. Smith
F. M. Lahey

INVENTOR
J. B. A. De Winter
BY Francis C. Bowen
ATTORNEY

UNITED STATES PATENT OFFICE.

JEAN BAPTIST ALOIS DE WINTER, OF NEW YORK, N. Y.

PLASTER.

SPECIFICATION forming part of Letters Patent No. 302,116, dated July 15, 1884.

Application filed January 14, 1884. (No specimens.)

*To all whom it may concern:*

Be it known that I, JEAN BAPTIST ALOIS DE WINTER, a subject of Belgium, residing at New York, in the county of New York and State of New York, have invented certain new and useful Improvements in Healing-Plasters for Corns and for other Purposes, of which the following is a specification, reference being had therein to the accompanying drawings.

My invention relates to the compound of which the plaster is composed, and also to a means for applying the same.

The invention consists in a novel combination of ingredients, whereby an efficient plaster is produced.

In carrying out my invention the plaster is prepared according to the following formula: I take one ounce of solid extract of Cannabis indica and saturate it with a sufficient quantity of nitric acid. I then add five ounces of salicylic acid and then add a sufficient quantity of oil of cloves to make a paste. The solid extract of Cannabis indica is placed in a mortar, and the nitric acid is poured on it, and the two are stirred with a spatula until throughly mixed and the Cannabis indica is saturated with the nitric acid. It is then dried in a close vessel, after which the mass, which is of a reddish-brown color, is reduced to powder and is mixed with salicylic acid in the proportion of five drams of acid to one dram of the powder. When thoroughly mixed, a sufficient quantity of oil of cloves is added to make a stiff paste, which is then spread upon a sheet of muslin, linen, or other suitable material, and when sufficiently dry it is stamped or cut out by means of dies in pieces of suitable shape and size to be applied to corns, warts, or bunions, or used for any other suitable purpose.

Instead of spreading the composition on sheets of fibrous or other material and then cutting out pieces of the same, the material itself may be first cut out in pieces of the proper shape, and placed in holes in a plate, over which the composition may be spread by a spatula, so as to pass through the holes and adhere to the material, so that a number of such pieces of the material may be coated simultaneously; or the material may be placed under the perforated plate, the composition spread thereon, so as to pass into the holes afterward and onto the material, and the pieces may be cut or stamped out. These pieces are then attached by any suitable means to a carrier of any suitable shape and material, provided with adhesive margins, to facilitate the application of the plaster to the desired part.

Figure 1:
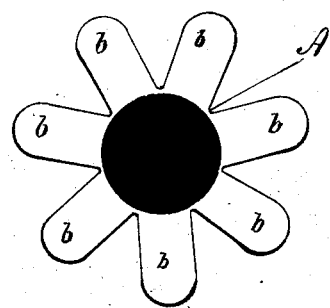
Figure 2:

The accompanying drawings illustrate a mode of carrying out this part of my invention, Figure 1 being a face view of a plaster and a carrier, and Fig. 2 a sectional view of the same.

A designates the plaster, prepared as above described and cut in a suitable shape, which is here represented as circular.

B is the carrier, which is made of linen, muslin, paper, or any other suitable material. It is also made in any suitable shape which will facilitate its application. As here shown, it is in the form of a multi-pointed star, or the form represented by a daisy, in which *b* would designate the petals of the flower. These points or petals *b* are covered with a suitable adhesive substance, *c*, which on being moistened will cause the plaster to adhere to the part to which it is applied and hold it there until its work is accomplished. By this construction facility is afforded for applying the plaster to any desired part—as, for example, to a joint or other portion of the body where flexibilty is desired.

What I claim is as follows—

The within-described composition for healing purposes, composed of Cannabis indica, nitric acid, salicylic acid, and oil of cloves, prepared in the proportions substantially as set forth.

In testimony whereof I affix my signature in presence of two witnesses.

JEAN BAPTIST ALOIS DE WINTER.

Witnesses:
FRANCIS CLARE BOWEN,
J. L. SMITHSON.